Nov. 25, 1941.                L. T. WHITE                2,264,106
                WORK HOLDING APPARATUS FOR MACHINE TOOLS
                         Filed April 11, 1941
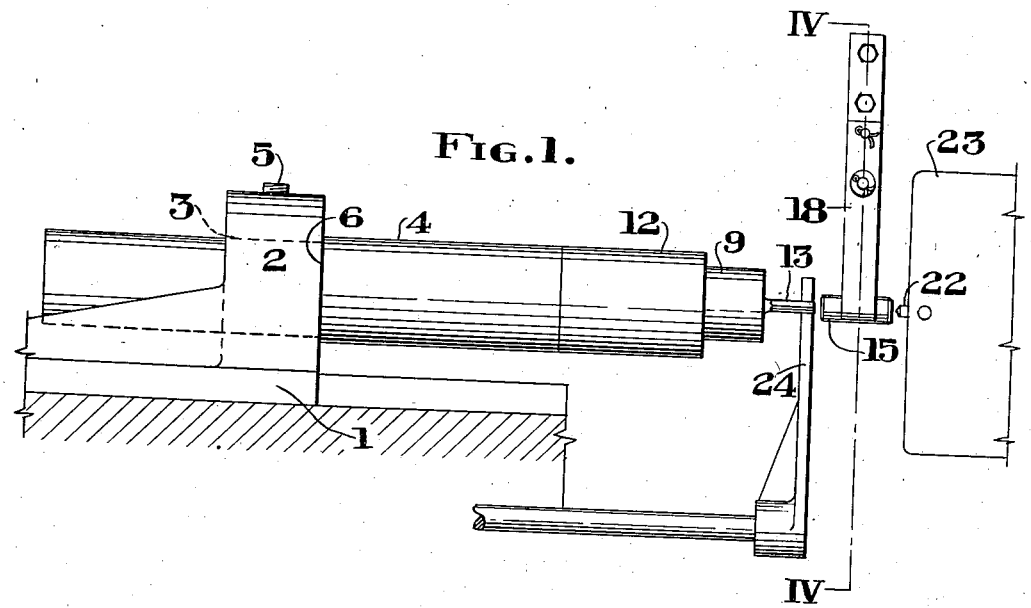
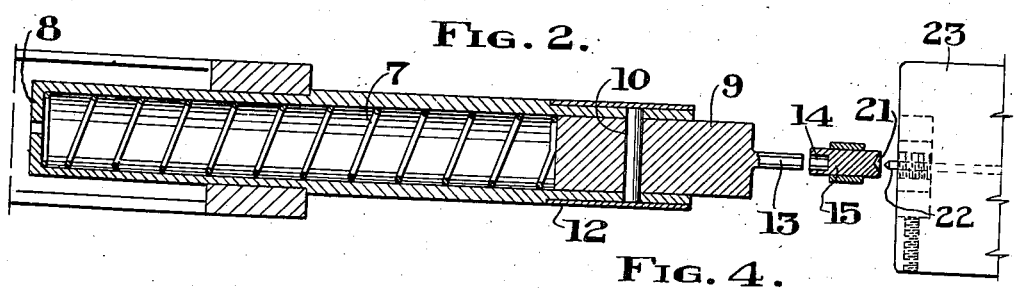
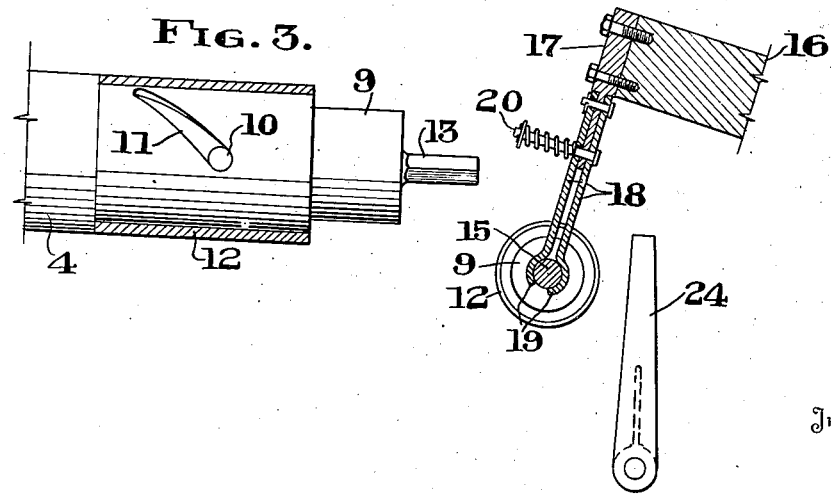
Inventor
Leon T. White
By W. S. McDowell
        Attorney Patented Nov. 25, 1941

2,264,106

UNITED STATES PATENT OFFICE 2,264,106

WORK HOLDING APPARATUS FOR MACHINE TOOLS

Leon T. White, Painesville, Ohio

Application April 11, 1941, Serial No. 388,099

6 Claims. (Cl. 10—107)

This invention relates to work holding and centering apparatus for use in connection with metal-working machine tools. More specifically, the invention is concerned with the production or machining of set screws of the end-socketed type. Screws of this category are formed with cylindrical bodies of substantially uniform diameter throughout their length, as contrasted with the usual type of headed set screws. To receive rotating tools, the ends of these socketed screws are formed with inwardly extending longitudinally disposed sockets having a multiplicity of angularly related polygonal walls, so that the ends of a shank of a correspondingly formed rotating tool may be received within these sockets to insert or remove the screws into and from threaded openings adapted for their reception.

Considerable difficulty has been encountered in presenting the cylindrical blanks from which set screws of this type are formed to the action of machine tools employed in threading, chamfering or otherwise machining the blanks, and it is the object of the present invention to provide improved means by which these blanks may be centered and effectively supported in connection with a machine tool while various machine operations are being performed thereon, to the end of facilitating such machining operations, increasing production thereof and reducing costs.

With these and other objects in view, the invention consists in the novel features of construction, combinations of elements and arrangements of parts, hereinafter more fully described and pointed out in the appended claims.

In the accompanying drawing:

Fig. 1 is a view in side elevation of the work blank holding and centering apparatus forming the present invention;

Fig. 2 is a horizontal sectional view taken through the apparatus;

Fig. 3 is a similar view disclosing the socket locating quill and its associated driver;

Fig. 4 is a vertical transverse sectional view on the plane disclosed by the line IV—IV of Fig. 1.

Referring more particularly to the drawing, the numeral 1 designates the lead screw slide of a conventional thread-producing machine tool. This slide, as usual, is mounted on a suitable bed, not shown, for sliding movement on longitudinal ways or guides. In this instance, the slide is provided with an upstanding bracket 2, formed with a horizontal opening 3. Positioned in this opening and rigidly carried by the bracket 2 is a quill sleeve 4, the latter being removably held in connection with the bracket by a clamping screw 5. The sleeve is also formed with an annular shoulder 6 which abuts one face of the bracket 2 around the opening 3 to limit the insertive movement of the sleeve into the bracket. Confined within the sleeve 4 is a coil spring 7. One end of this spring seats against the closed end 8 of the sleeve, while the other end of the spring yieldably contacts a socket-locating quill 9, which is slidably and rotatably mounted in the open end of the sleeve 4. The quill 9 carries a transversely extending indexing pin 10, the latter being of sufficient length as shown in Fig. 2, so that the ends thereof project beyond the sides of the quill 9 in order that these projecting ends may be received within short helical slots 11 provided in and near the open end of the sleeve 4. A ferrule 12 surrounds the open end of the sleeve and encloses the slots 11 and the projecting ends of the pin 10.

Formed with the quill 9 and projecting axially therefrom is a hexagonal driver 13, which is adapted to be aligned with a hexagonal socket 14 provided in one end of a set screw blank 15. While the driver 13 has been described as being hexagonal in cross section and likewise the socket 14 of the blank 15, it will be understood that this construction is subject to modification, since it is possible that the driver or socket may be substantially square in cross section, triangular, X-shaped or otherwise slotted. It will be understood as the description proceeds that the principles of the present invention are applicable to these various shapes. The problem solved by the present invention is that of automatically centering the driver 13 with the socketed end of the work blank, so that without manual attention, and in the automatic operation of the machine, the driver will properly enter the socket in order to hold the blank while various machine operations, such as threading, are being performed thereon. It will be appreciated that when the driver is moved longitudinally from the position disclosed in Fig. 1 toward the aligned work blank, it is necessary that corresponding surfaces on the driver should be accurately registered with the coacting surfaces of the blank socket, and it is to this end that the mechanism comprising the present invention is particularly adapted.

In presenting the work blanks into registration with the driver, use is made of an oscillating holder arm 16. As shown in Fig. 4, the forward end of the arm 16 is equipped with a head 17.

Connected with the head is a pair of relatively separable plates 18, the lower ends of said plates being formed with arcuate jaws 19 between which the work blanks are positioned and resiliently clamped. This may be done manually when the arm 16 occupies an out-of-the-way inactive position. A spring and stud construction 20 may be used to maintain the plates 18 and their associated jaws 19 in resilient contact with the blanks. After a blank has been inserted between the jaws 19, the arm 16 is rocked by a suitable mechanism to bring the blank supported therefrom into longitudinal registration with the driver 13. The slide 1 is then advanced, bringing the end of the driver 13 into contact with the socketed end of the blank 15. If the hexagonal shape of the driver does not exactly match with the hexagonal socket 14 to permit the driver to enter said socket, forward movement of the quill 9 is arrested, causing the quill to be retracted within the sleeve 4, which advances in unison with the slide 1, and compressing the spring 7. This causes the quill to rotate, due to the movement of the pins 10 in the spiral slots 11, and this rotation continues until the hexagonal driver comes into exact alignment with the hexagonal walls of the blank socket. At this time, the quill 9 ceases to rotate or turn, but continues to advance with the slide 1 and the sleeve 4 until the driver 13 is fully inserted in the socket 14 of the blank 15. The holder arm 16 is then rocked to release the blank from engagement with the jaws 19, assuming an inactive position permitting of the introduction of a new blank into said jaws.

The end of the blank 15, opposed to its socketed end 14, and which may be provided with a centering depression 21, is then advanced by the continued forward movement of the slide 1, into engagement with the outer end of a stem 22, which is carried axially by a die head 23, completing the rotation of the quill 9 by the contacting of the pins 10 with the ends of the slots 11. The blank now enters the die head 23, which contains conventional threading dies, or other metal cutting tools, and in which the threading of the blank may be completed, such, for instance, as by the rotation of the threading dies of the head 23. When this machining has been completed, the die head opens and the slide 1 is moved to its return or starting position. During this return movement of the slide, a stripper arm 24 is rocked so that its upper end portion will contact with the side of the driver 13 in front of the blank, so that the arm will strip the machine blank from the driver, permitting it to drop or roll to a discharge position. The stripper arm then swings to an inactive position and the cycle of operation, above given, is repeated.

The apparatus provided with the present invention thus enables a polygonal walled driver to register with and properly enter the correspondingly formed walls of a work blank socket, the registering of the driver with the socket being automatically effected without the necessity of manual control.

What is claimed is:

1. Mechanism for presenting work blanks to machine tools, comprising a driver having flat angularly related side walls and corner edges, a support for said driver, holder means for supporting a work blank in longitudinal alignment with said driver, said blank having one end thereof provided with a socket formed with flat angularly related side walls and corner edges corresponding to those of the driver and in which socket said driver is adapted to be slidably and non-rotatably received, means for effecting relative longitudinal approach between the holder supported work blank and said driver, and means for partially rotating said driver relative to its support to precisely register the corner edges and angularly related flat walls of the driver with those of the blank socket when such registration does not originally obtain, whereby to enable the driver to enter and occupy the blank socket.

2. Mechanism for presenting work blanks to machine tools comprising a slide member, a sleeve carried by said slide member, a driver supported in said sleeve for limited slidable and rotative movement with respect thereto, a blank-engaging extension formed with said driver, said extension having flat angularly related side walls and corner edges, means for supporting a work blank in longitudinal alignment with said driver extension, said blank having one end thereof provided with a socket formed with the same flat angularly related side walls and corner edges as those of said driver extension and in which socket said driver extension is adapted to be slidably and non-rotatably received, and means for partially rotating said driver in its sleeve to precisely register the corner edges and angularly related walls of the driver extension with those of the blank socket, whereby to enable the driver extension to enter and occupy the blank socket.

3. Mechanism for presenting set screw blanks to machine tools comprising a driver, a slide member having a sleeve in which said driver is mounted for limited sliding and rotative movement, said sleeve having the walls thereof formed with a helical slot, pin means carried by said driver and received within said slot, a spring positioned in said sleeve and normally serving to maintain said pin means in one end of said slot, an extension projecting longitudinally from said driver, said extension having flat angularly related side walls and adjoining corner edges, and a movable blank holder for supporting a work blank in longitudinal alignment with said driver extension, said blank having one end thereof provided with a socket formed with flat angularly related side walls and corner edges corresponding to those of the driver, whereby when the extension of said driver is moved into engagement with said work blank, said slot will serve to provide for partial rotation of the driver to register the corner edges and angularly related flat walls of said extension with those of the blank socket, thereby enabling the driver to enter and occupy the socket.

4. Apparatus for holding screw blanks of the type having peculiarly shaped sockets in one end while performing machine operations thereon comprising a supporting member mounted for longitudinal non-rotative movement, a sleeve-like body rigidly carried by said member, said sleeve having a spiral guide formed therewith, a quill member disposed for longitudinal movement in said body, means carried by said quill and disposed in said spiral guide, means for yieldably resisting movement of said quill member into said body, movement of said quill in opposition to said yieldable resisting means serving to impart partial rotation to said quill member, and a blank engaging element projecting from said quill member, said element projecting from said quill member, said element being shaped to fit the peculiar sockets in said blanks.

5. Apparatus for holding screw blanks of the type having peculiarly shaped sockets in one end while performing machine operations thereon comprising a supporting member mounted for longitudinal non-rotative movement, a sleeve-like body rigidly carried by said member, said sleeve having a spiral guide formed therewith, a quill member disposed for longitudinal movement in said body, a pin carried by said quill member, one end of said pin being disposed in said guide, spring means disposed in said body to normally hold said quill member in an extended position, movement of said quill in opposition to said spring serving to impart rotative movement to said quill through engagement of said pin with said guide, and a blank engaging element projecting from said quill member, said element being shaped to fit the sockets in said blanks.

6. Apparatus for holding screw blanks of the type having peculiarly shaped sockets in one end while performing machine operations thereon comprising a supporting member mounted for longitudinal non-rotative movement, a hollow body rigidly carried by said member, spiral guide means provided on said body, a quill member disposed for sliding movement in said body, said member engaging said guide means and being partially rotated thereby upon movement of said member longitudinally of said body, resilient means for moving said member in one direction in said body, a blank engaging element projecting from said member, the engagement of said element with a relatively immovable object during movement of said supporting member serving to move said quill member in opposition to said resilient means and impart limited rotary movement thereto, said blank engaging element being shaped to fit the sockets in said blanks, and means for removing said blanks from said engaging element after completion of said machining operations.

LEON T. WHITE.